UNITED STATES PATENT OFFICE.

JOSEPH C. TIFFANY, OF COXSACKIE, NEW YORK.

IMPROVEMENT IN THE MANUFACTURE OF ILLUMINATING-GAS.

Specification forming part of Letters Patent No. 175,206, dated March 21, 1876; application filed December 8, 1875.

*To all whom it may concern:*

Be it known that I, JOSEPH CAPRON TIFFANY, of Coxsackie, in the county of Greene and State of New York, have invented certain new and useful Improvements in the Manufacture of Illuminating-Gas, of which the following is a specification:

This invention relates to certain improvements in the manufacture of illuminating-gas, its object being to cheapen the production of the same by utilizing various products hitherto lost in the manufacture of such gas, and render the poorer qualities of coal and other gas producing materials available for the manufacture of gas of proper illuminating properties.

My invention consists in the process of manufacturing illuminating-gas by adding to poor gas, or gas deficient in illuminating properties from coal or other gas-producing substances, the gases produced from paraffine or paraffine oils, or a gas rich in olefiant gas, in such proportion depending upon the illuminating power of the poor gas as to produce a gas of the desired candle-power, as hereinafter more fully set forth.

It is a well-known fact that olefiant gas possesses a strong affinity for the various liquid and solid hydrocarbons, combining chemically with such substances, and forming a permanent gaseous compound, from which such hydrocarbons will not condense.

I have discovered in addition to this that such olefiant gas has an equally strong affinity for hydrogen gas, or other gaseous hydrocarbons uniting chemically with the same, and producing a definite chemical compound that will retain its properties under all ordinary variations of temperature, and which will not be subject to stratification like the mechanical mixtures of hydrocarbon gases, which have hitherto been resorted to in all previous attempts to enhance the illuminating powers of the poorer coal-gas, and gases produced from other poor gas-producing materials.

In generating illuminating-gas from the best qualities of coal, it is well known that toward the end of the charge the gas given off is deficient in illuminating properties, rendering it necessary to stop the process and draw the charges before the whole amount of gas contained in the coal is distilled over, to prevent the poorer gas given off toward the end of the charge from deteriorating the illuminating quality of the gas already produced. This entails much waste and loss in the production of illuminating-gas, and it has long been a desideratum to devise some means by which such poorer gases could be utilized.

I have taken advantage of the affinity of olefiant gas for the poorer gases generated from poor coal and other gas-producing substances that give off a gas deficient in illuminating properties, and by combining with such gases gases rich in olefiant gas, such as the gas produced from paraffine and paraffine oils of various gravities, I not only take up and utilize the condensible hydrocarbons that have hitherto gone to waste, but I bring about a chemical decomposition, by means of which the poorer gases and said condensable products and the olefiant gas are all combined and assimilated, forming a fixed gas of high illuminating power, the constituents of which will not condense or stratify, as is ordinarily the case in mixed gases as heretofore produced.

In carrying out my invention, I produce the coal-gas and paraffine gas in separate retorts, running the charge of coal as long as any gas is given off from the same. I then, after the coal-gas leaves the retort, introduce the paraffine-gas into the same, either in the main holder or at any other convenient point.

The proportion of paraffine-gas employed will vary according to the quality of coal-gas produced, and the gravity of the paraffine-oil employed in the production of the gas, but I generally employ the paraffine gas in such proportions as to introduce from one to twenty-five per cent. of olefiant gas into the coal-gas. The gases thus mixed combine chemically with each other, and also with the condensible products of the coal-gas, which have hitherto been wasted, forming a permanent illuminating-gas that will not stratify, and which will preserve its illuminating qualities under all ordinary variations of temperature.

Besides the advantage of utilizing all the gas produced from the better qualities of coal, such as cannel-coal, and the like, heretofore deemed necessary in the manufacture of gas, to bring it up to the proper illuminating standard, I can, by my process, dispense with such coals, which are very expensive, and employ the poorer and less expensive qualities alone, which have hitherto been considered worthless in the manufacture of gas, thus materially reducing the expense of its manufacture.

What I claim, and desire to secure by Letters Patent, is—

The process of manufacturing illuminating-gas, which consists in adding to poor gas, or gas deficient in illuminating properties from coal or other gas-producing substance, the gases produced from paraffine or paraffine oils, or a gas rich in olefiant gas, in such proportion, depending upon the illuminating power of the poor gas, as to produce a gas of the desired candle-power, substantially as described.

In testimony that I claim the foregoing I have hereunto set my hand in the presence of the subscribing witnesses.

JOSEPH CAPRON TIFFANY.

Witnesses:
H. C. BANKS,
EDWARD SWAGER.